(12) United States Patent
Lanfranchi

(10) Patent No.: US 6,478,140 B2
(45) Date of Patent: Nov. 12, 2002

(54) SAFETY DEVICE FOR MACHINES FOR ALIGNING CONTAINERS, IN PARTICULAR POLYETHYLENE BOTTLES

(75) Inventor: Mario Lanfranchi, Collecchio (IT)

(73) Assignee: Lanfranchi S.R.L., Collecchio (IT)

( * ) Notice: Subject to any disclaimer, the term of this patent is extended or adjusted under 35 U.S.C. 154(b) by 0 days.

(21) Appl. No.: 10/050,886

(22) Filed: Aug. 3, 2001

(65) Prior Publication Data

US 2002/0104737 A1 Aug. 8, 2002

Related U.S. Application Data

(63) Continuation of application No. PCT/IT00/00025, filed on Jan. 25, 2000.

(51) Int. Cl.[7] .............................................. B65G 17/32
(52) U.S. Cl. ................................................ 198/397.02
(58) Field of Search ............................ 198/397.02, 400

(56) References Cited

U.S. PATENT DOCUMENTS 2,631,769 A * 3/1953 Everett
4,825,995 A * 5/1989 Nalbach ...................... 198/380
5,065,852 A * 11/1991 Marti ......................... 198/392
5,549,189 A * 8/1996 Martisala .................... 198/380
6,098,781 A * 8/2000 Lanfranchi .................. 198/396

FOREIGN PATENT DOCUMENTS

| EP | 0540 477 A1 * | 9/1992 | ........... B65B/43/42 |
| EP | 0 540 477 | 5/1993 | ........... B65B/43/42 |

* cited by examiner

Primary Examiner—Christopher P. Ellis
Assistant Examiner—Richard Ridley
(74) Attorney, Agent, or Firm—Darby & Darby

(57) ABSTRACT

The present invention relates to the sector of automatic plants for filling containers or in particular bottling plants, in the form of a safety device in aligning machines of the type comprising a cylindrical hopper (2) rotating about a vertical axis (3), a fixed conical structure (5) and a plurality of hoists (6), each operated by an operating arm (8). Each operating arm (8) in an original manner is formed by means of at least two sections (8a, 8b) which are connected together by means of a hinge connection (10) so as to rotate with respect to each other in the event of jamming of the corresponding hoist (6). Moreover, the sections (8a, 8b) comprise means (11) which are designed to keep said sections in the working or thrusting position of the operating arm (8) until a threshold resistive force is exceeded.

5 Claims, 6 Drawing Sheets

SAFETY DEVICE FOR MACHINES FOR ALIGNING CONTAINERS, IN PARTICULAR POLYETHYLENE BOTTLES

This is a continuation of international application Ser. No. PCT/IT00/00025, filed Jan. 25, 2000, the entire disclosure of which is hereby incorporated by reference.

TECHNICAL FIELD AND BACKGROUND ART

The present invention relates to a safety device for machines for aligning containers, in particular polyethylene bottles.

The present invention falls within the sector of automatic plants for filling containers or in particular bottling plants in which aligning machines are widely used, said machines being designed to receive the bottles or containers arranged randomly and straighten them, positioning them in a row on a conveyor belt with their openings directed upwards. Different types of aligning machines are known, being distinguished depending on how they perform selection of the containers introduced into the machine in a disorderly manner. In particular two types of aligning machine are known: the first, which forms the subject of patent No. IT 1080144 in the name of Rationator-Maschinenbau GMBH, is distinguished essentially by the fact that it has a disc rotating about an inclined axis and having peripherally a series of recesses inside which the containers are arranged horizontally and are displaced from a lower level to a higher level following rotation of the said disc. According to the second solution, forming the subject of patent No. IT 1253395 in the name of the same Applicant, a cylindrical hopper rotating about a vertical axis and arranged inside and coaxial with an external fixed cylinder is provided. The machine also comprises a conical structure which conveys the containers towards a plurality of thrusting devices or hoists performing an alternating vertical translatory movement so as to transport the said containers, which are arranged horizontally, from the bottom of the conical structure to receiving seats provided at the top of the cylindrical hopper. Between the internal hopper and the external cylinder a cavity is present, through which the containers raised by the hoists fall inside straightening hoppers.

The alternating vertical translatory movement is imparted to the hoists by means of radial arms rotating about the axis of rotation of the hopper and travelling along a fixed cam formed so as to raise and lower the said arms and consequently the hoists.

The safety device according to the present invention relates in particular to this second type of aligning machine.

In fact, in these aligning machines, the arms, which are actuated by the cam so as to raise the hoists, are unable to stop said raising movement should jamming occur, for example owing to incorrect positioning of the container or the selection of a defective or deformed container.

The known aligning machines, of the type with a vertical axis comprising hoists for selecting the containers, therefore do not comprise safety devices which are able to detect possible jamming of a hoist and prevent forced raising thereof, with the consequent risks of breakage and malfunctioning which may result in slowing-down of production or even prolonged machine stoppages.

DISCLOSURE OF INVENTION

The object of the present invention is to eliminate the abovementioned drawbacks and provide a safety device which detects any jamming and prevents the raising movement of the hoist, thus avoiding needless over-stressing of the arm and the said hoist, possible breakages, delays and any machine stoppages.

A further advantage of the present invention is that of providing a safety device which is simple and easy to produce, is low-cost and does not result in structural complications within the aligning machine.

Said objects are fully achieved by the safety device for machines for aligning containers, in particular polyethylene bottles, according to the present invention, which is characterized by the contents of the claims indicated below.

In particular, the operating arms which cause raising of the hoists consist of at least two sections which are hinged together and kept in the thrusting position by suitable resilient or mechanical means so that, in the event of jamming, the two sections are able to rotate relative to one another, preventing raising of the said hoist.

BRIEF DESCRIPTION OF DRAWINGS

These and other characteristic features will emerge more clearly from the following description of a preferred embodiment illustrated, purely by way of a non-limiting example, in the accompanying plates of drawings, in which.

BEST MODE FOR CARRYING OUT THE INVENTION

Figure 1:
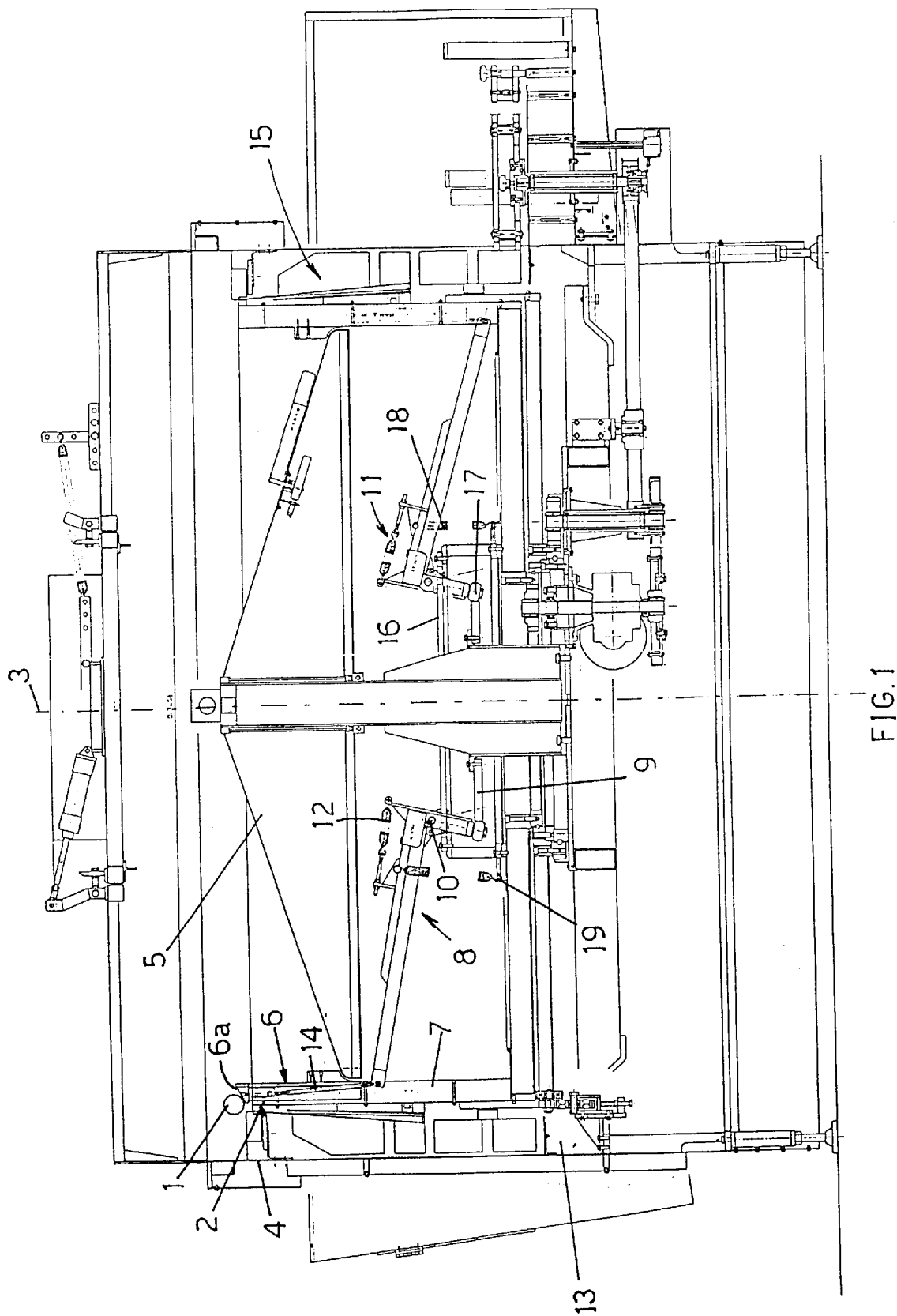
FIG. 1 shows a cross-sectional front view of an aligning machine.
Figure 2:
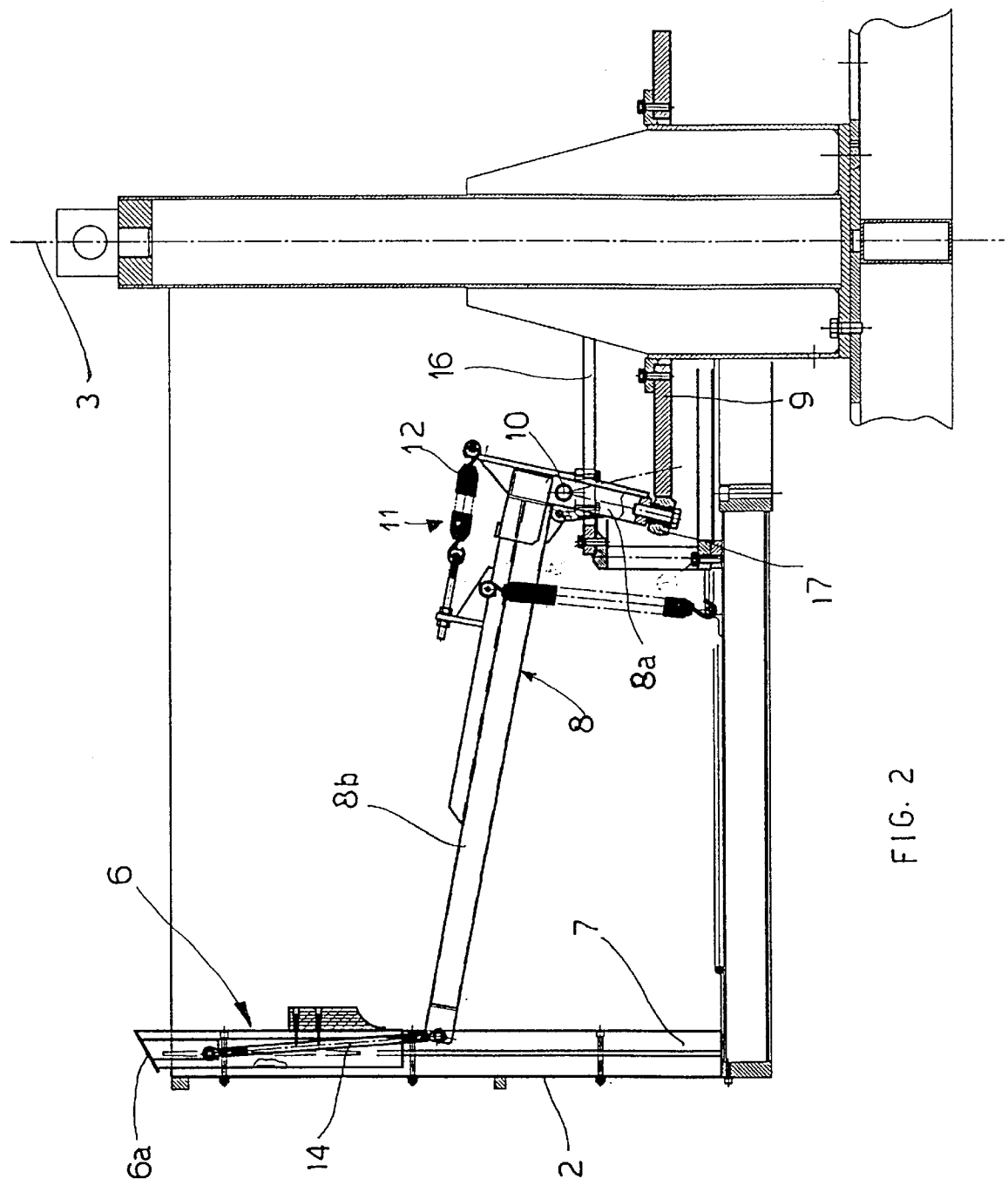
FIGS. 2 and 3 show a detail of the machine according to FIG. 1 with a hoist in the high and low positions, respectively.
Figure 3:
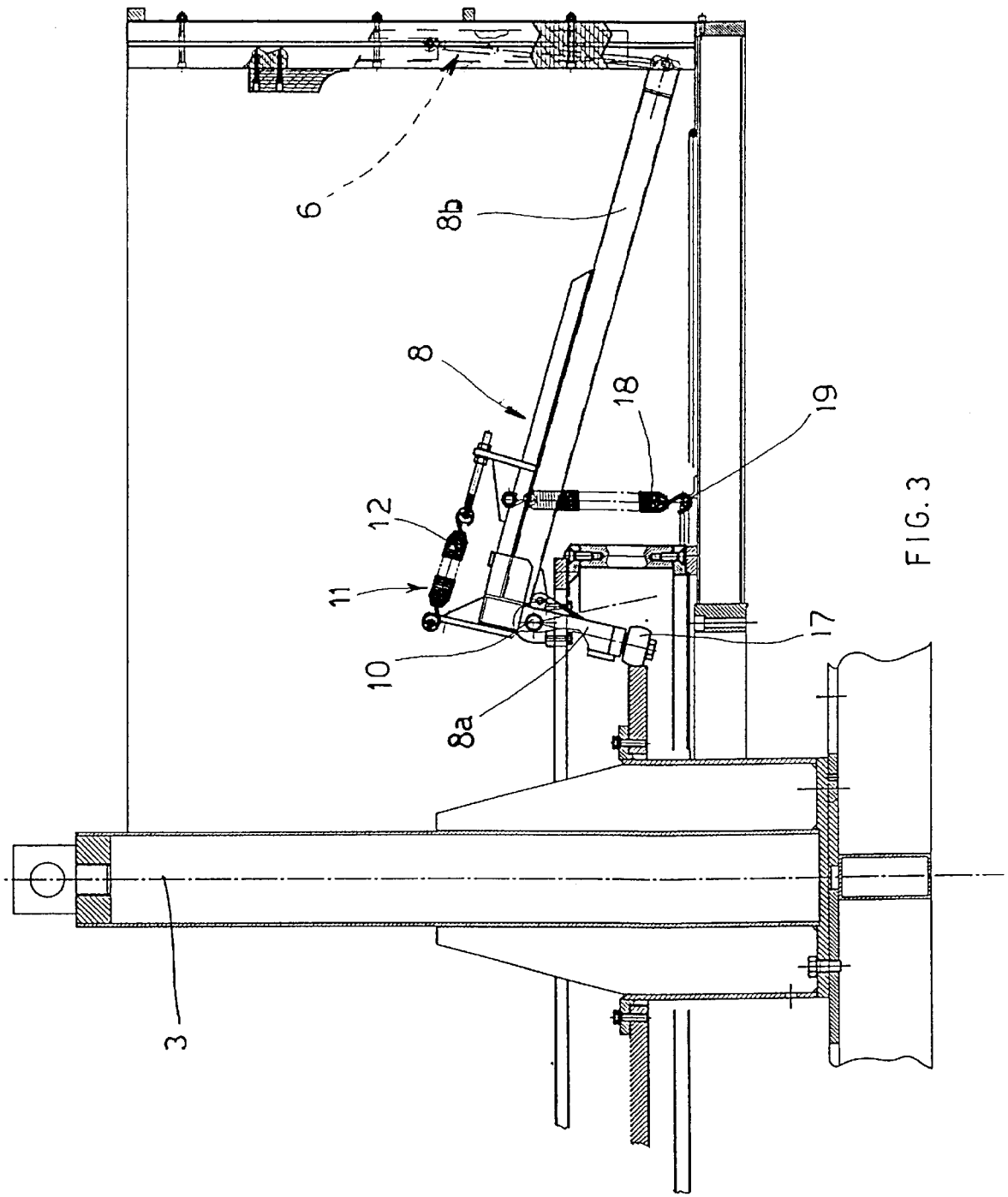
Figure 4:
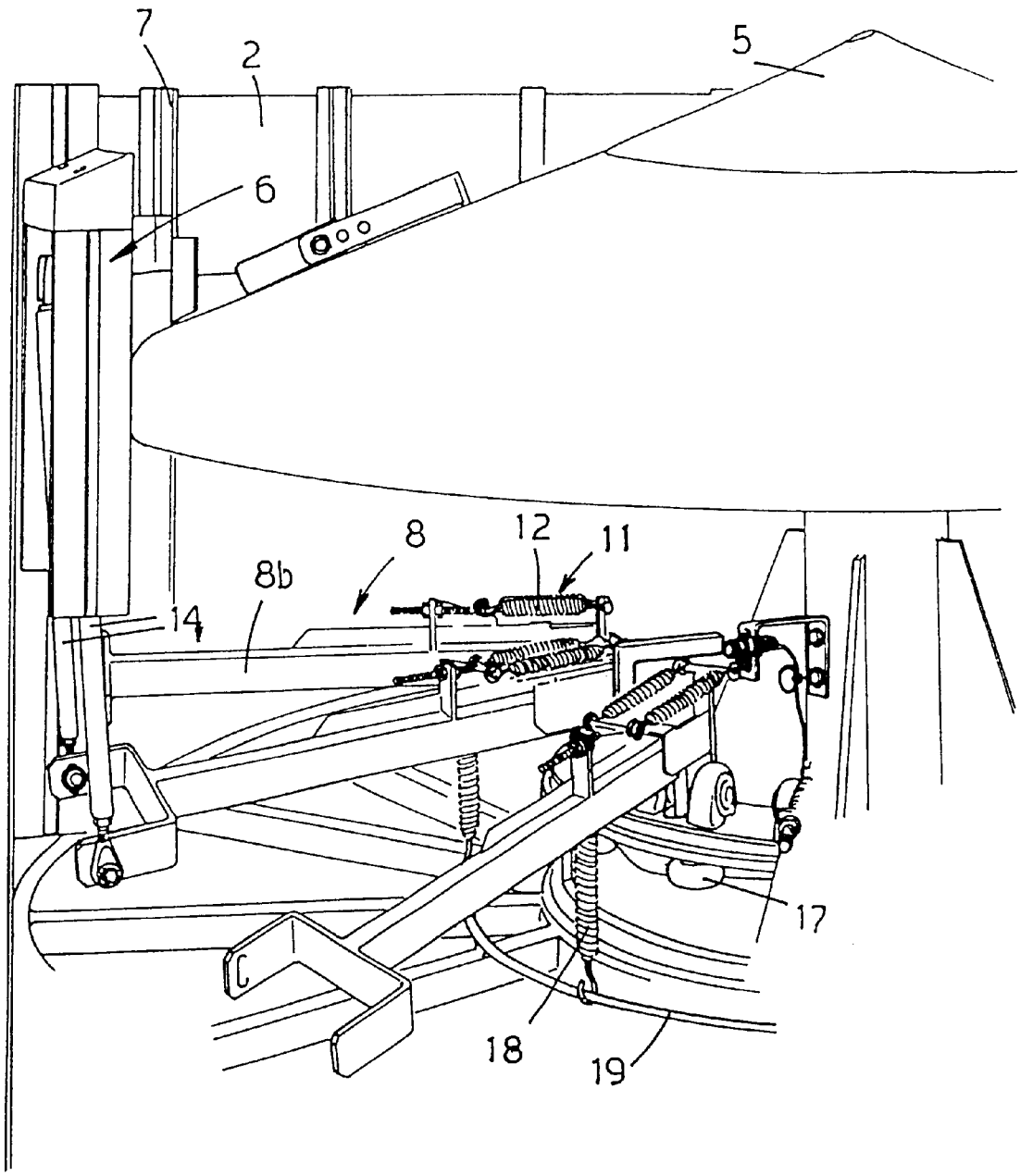
FIG. 4 shows a perspective view of a portion of the aligning machine illustrated in FIG. 1.

With reference to the Figures, 1 denotes a container introduced inside an aligning machine. In particular, the container 1 may consist of a polyethylene bottle.

The aligning machine illustrated in the figures is of the type comprising a cylindrical hopper 2 into which the containers 1 are introduced in a random manner from above by means of a conveyor belt not shown. The hopper 2 is made to rotate by means known per se about a vertical axis 3 and is coaxial with a fixed external cylinder 4 so that a cavity 13 is present between the cylindrical hopper and the external cylinder. Aligning means 15 of the known type, which are designed to arrange the containers 1 vertically with their openings directed upwards, are present inside the cavity 13 and fixed to the external wall of the cylindrical hopper 2.

A conical structure 5 is present inside the cylindrical hopper 2 and coaxial therewith, said structure forming an inclined surface for travel of the containers 1 between a higher level and a lower level located in the vicinity of the wall of the said cylindrical hopper.

The internal wall of the cylindrical hopper 2 comprises a plurality of guides 7 which are arranged vertically and inside which hoists 6 are able to travel between a bottom position close to the lower level of the conical structure 5 and a top position at the top of the cylindrical hopper 2, where the aligning means 15 are present.

The hoists 6 have a substantially box-shaped form and have an inclined surface 6a on which the containers 1 are arranged in a horizontal position, resting also against the hopper 2.

The hoists 6 travel inside the guides 7 with an alternating vertical translatory movement performed by actuating means comprising a plurality of operating arms 8 arranged radially with respect to the cylindrical hopper 2.

The operating arms 8 are made to rotate about the vertical axis 3 by means of a flange 16. Each hoist 6 interacts with one end of the operating arm 8 by means of a connecting rod 14, the ends of which are connected respectively to the hoist 6 and to the operating arm 8 by means of a ball joint 14a.

Each operating arm 8 is formed, in an original manner, by at least two sections 8a and 8b which are connected together by means of a hinge connection 10 so as to rotate with respect to each other in the event of jamming of a hoist 6 and which comprise means 11 which are designed to keep said sections in the working or thrusting position of the operating arm 8 until a threshold resistive force is exceeded.

The variation of embodiment illustrated in FIGS. 1 to 4 has two sections 8a and 8b which are substantially perpendicular during the working or thrusting phase of the operating arm 8, namely when the hoist 6 travels along the guides 7 without jamming. The means 11, which are designed to keep said sections in the working position, comprise resilient means 12 in turn comprising at least one spring having ends fixed respectively to the two sections 8a,8b.

One end of the section 8a has a roller 17 travelling in contact with a fixed cam 9, having a substantially horizontal extension and causing the alternating vertical movement of the hoists 6. The contact between the fixed cam 9 and the roller 17 is ensured by the presence of resilient means 18 acting between the operating arm 8 and a fixed ring 19.

Figure 5:
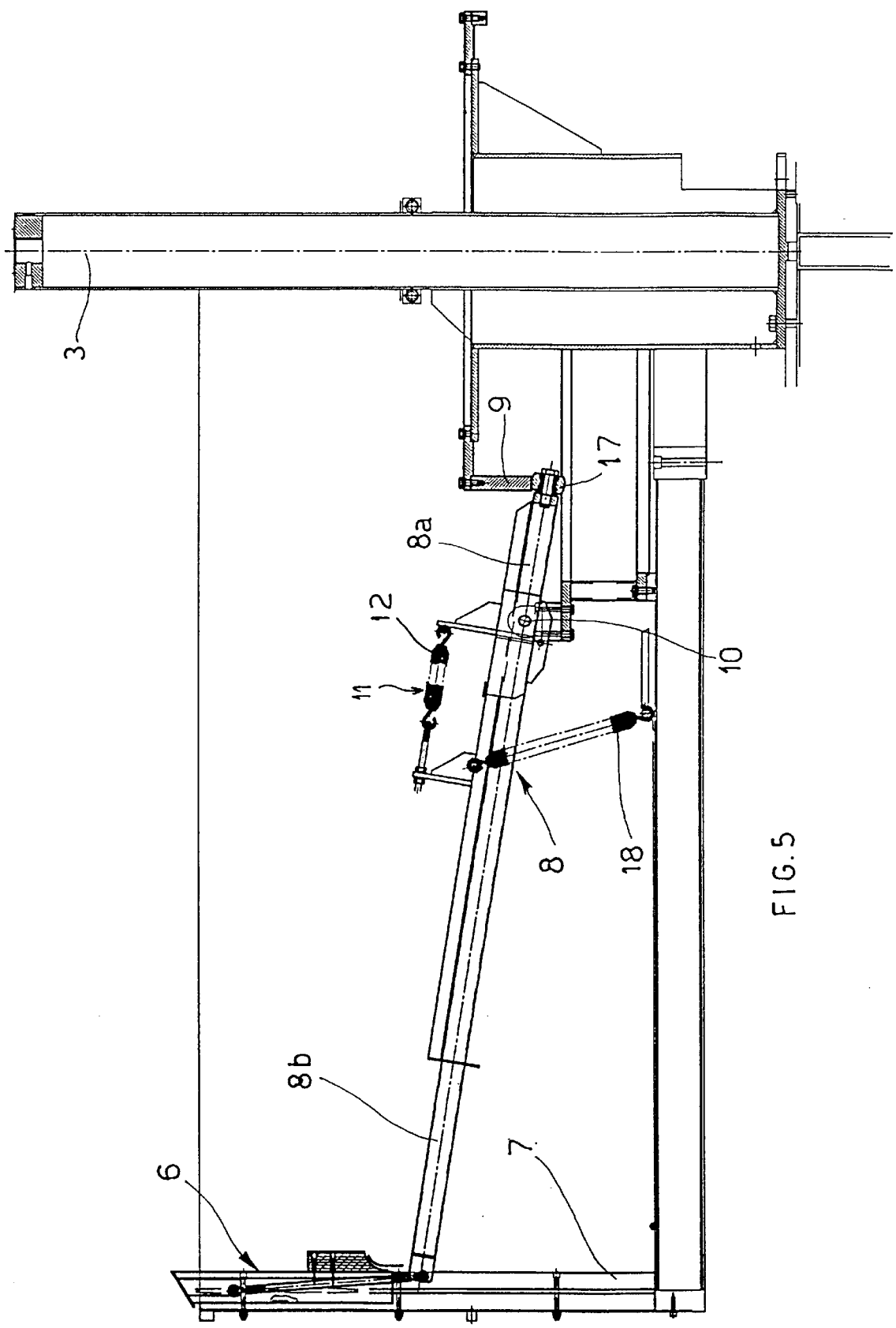
FIGS. 5 and 6 show a portion of a variation of embodiment with a hoist in the high and low positions, respectively.
Figure 6:
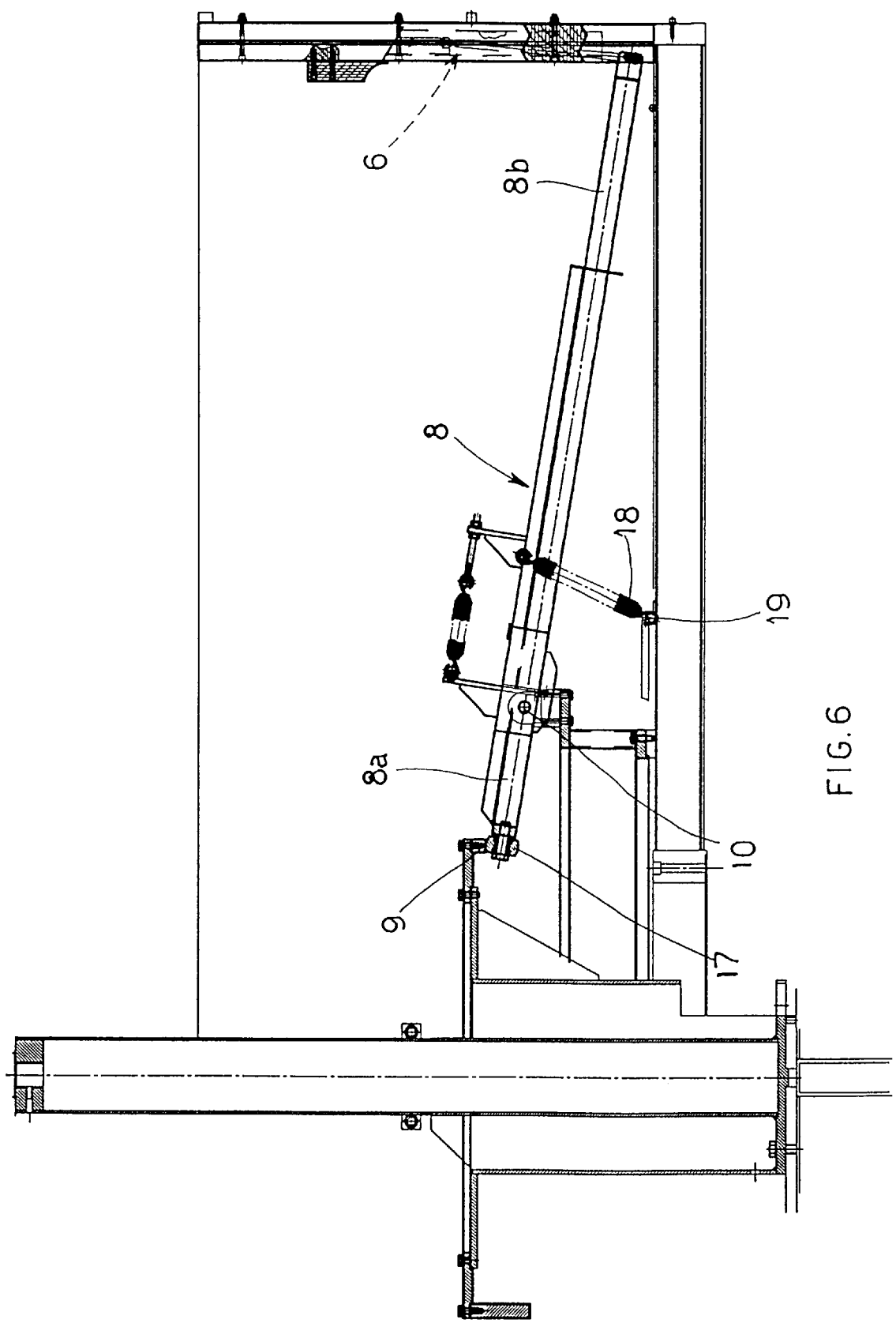

In the variation of embodiment according to FIGS. 5 and 6, each operating arm 8 comprises two sections 8a and 8b which are arranged in line during the working or thrusting phase of the said operating arm 8. The means 11, which are designed to keep said sections in the working position, comprise resilient means 12 in turn comprising at least one spring having its ends fixed respectively to the two sections 8a, 8b.

The fixed cam 9 interacting with one end of the section 8 has a substantially vertical extension.

In a variation of embodiment, not shown, the means 11 which are designed to keep the sections 8a and 8b in the working or thrusting position of the operating arm 8 comprise mechanical means which are formed by means of a pin with a predefined breaking load less than the breaking load of the arm.

The containers 1 supplied by a conveyor belt fall onto the conical structure 5 and roll towards the lower level of the said structure.

The cylindrical hopper 2 rotates about the vertical axis 3 and at the same time the hoists 6 are translated vertically with respect thereto, being actuated by the fixed cam 9.

When the container 1 comes into the vicinity of a hoist 6, if the hoist is raised, the container stops against the wall forming the box-shaped structure of the said hoist; if the hoist 6 is lowered, the container 6 is positioned between the inclined wall 6a and the hopper 2 and is raised until it reaches the top of the hopper 2 and consequently the aligning means 15.

The safety device enters into operation in the case where the container 1 is deformed or jams, preventing the translatory movement upwards of the hoist 6. In particular, when the resistive force which opposes travel of the hoist reaches a predefined threshold value such as not to allow the means 11 to keep the sections 8a and 8b in the working position, the presence of the hinge connection between the two sections 8a and 8b forming the operating arm 8 allows a relative rotation of the two sections and avoids forces which may damage the structure, while the cam 9 continues to act on the section 8a as though the hoist 6 were actually moving upwards.

In the variation of embodiment illustrated, the means 11 comprise resilient means 12. In this case, the relative rotation of the two sections 8a and 8b occurs when the resistive force is such as to allow lengthening of the said resilient means 12.

In the case where the means 11 comprise mechanical means such as a pin, the relative rotation of the two sections 8a and 8b occurs when the resistive force which the hoist encounters during its vertical translatory movement exceeds a threshold value corresponding to the breaking load of the pin. In this way the pin splits and the section 8b is no longer rigidly joined to the section 8a which continues to travel along the fixed cam 9 without causing translation of the hoist 6.

What is claimed is:

1. Safety device for machines for aligning containers (10) comprising:

a cylindrical hopper (2) which rotates about a vertical axis (3) and is coaxial with a fixed external cylinder (4) and into which the containers (1) are introduced in a random manner from above;

a conical structure (5) which is situated inside the cylindrical hopper (2) and is coaxial therewith and which directs the containers (1) introduced from above towards a lower level;

a plurality of hoists (6) which have a substantially box-shaped form and which perform a vertical alternating movement inside guides (7) formed on the wall of the cylindrical hopper (2) and which are designed to receive, between an inclined surface (6a) of the said hoists and the cylindrical hopper (2), the containers (1) supplied by the conical structure (5) and arranged horizontally;

means for actuating the hoists (6) comprising a plurality of operating arms (8) which are arranged radially with respect to the cylindrical hopper (2), are made to rotate about the vertical axis (3) and travel in contact with a fixed cam (9) causing the alternating vertical movement of the hoists (6);

characterized in that each operating arm (8) comprises at least two sections (8a, 8b) which are connected together by means of a hinge connection (10), so as to rotate with respect to each other in the event of jamming of the corresponding hoist (6) and comprise means (11) which are designed to keep said sections in the working or thrusting position of the operating arm (8) until a threshold resistive force is exceeded.

2. Safety device according to claim 1, in which each operating arm (8) comprises two sections (8a and 8b) which are arranged so as to be substantially perpendicular with respect to each other in the working or thrusting position of the operating arm (8), the section (8a) having one end interacting with the fixed cam (9) having a substantially horizontal extension.

3. Safety device according to claim 1, in which each operating arm (8) comprises two sections (8a and 8b) which are arranged so as to be substantially in line with each other in the working or thrusting position of the operating arm (8), the section (8a) having one end interacting with the fixed cam (9) having a substantially vertical extension.

4. Safety device according to claim 1, in which the means (11) comprise resilient means (12) comprising at least one spring having ends fixed to two adjacent sections (8a, 8b).

5. Safety device according to claim 1, in which the means (11) comprise mechanical means comprising a pin with a predefined breaking load less than the breaking load of the arm.

* * * * *

UNITED STATES PATENT AND TRADEMARK OFFICE
CERTIFICATE OF CORRECTION

PATENT NO.     : 6,478,140 B2
DATED          : November 12, 2002
INVENTOR(S)    : Mario Lanfranchi It is certified that error appears in the above-identified patent and that said Letters Patent is hereby corrected as shown below:

<u>Title page,</u>
Item [30], add
 -- [30] Foreign Application Priority Data
February 22, 1999 (IT) ................................ PR 99A000013 --

Signed and Sealed this

Seventeenth Day of June, 2003

JAMES E. ROGAN
*Director of the United States Patent and Trademark Office*